(12) United States Patent
Kelly

(10) Patent No.: US 9,032,687 B2
(45) Date of Patent: *May 19, 2015

(54) SYSTEM FOR MANUFACTURING A REINFORCEMENT

(71) Applicant: Steven Edward Kelly, Voorst (NL)

(72) Inventor: Steven Edward Kelly, Voorst (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/197,740

(22) Filed: Mar. 5, 2014

(65) Prior Publication Data

US 2014/0311080 A1  Oct. 23, 2014

Related U.S. Application Data

(63) Continuation of application No. 11/597,697, filed as application No. PCT/NL2005/000389 on May 26, 2005, now Pat. No. 8,701,370.

(30) Foreign Application Priority Data

May 27, 2004  (NL) .................................... 1026278

(51) Int. Cl.
*E04C 5/16* (2006.01)
*B21F 27/08* (2006.01)
*B21F 27/12* (2006.01)
*E04C 5/06* (2006.01)
*F16B 2/24* (2006.01)

(52) U.S. Cl.
CPC ................. *E04C 5/162* (2013.01); *B21F 27/08* (2013.01); *B21F 27/12* (2013.01); *E04C 5/06* (2013.01); *F16B 2/243* (2013.01)

(58) Field of Classification Search
CPC ............ B21F 27/08; B21F 21/12; E04C 5/05; E04C 5/162; F16B 2/243
USPC ........... 52/712, 713, 684–688, 677, 719, 665, 52/369; 248/73, 71, 74.2, 74.1, 218.4, 248/316.7, 60, 63, 230.7, 68.1, 339, 62, 72, 248/51, 110, 113; 403/207, 208, 213, 215, 403/374.5, 230, 241, 240, 239; 256/57
See application file for complete search history.

(56) References Cited

U.S. PATENT DOCUMENTS

| 1,275,430 | A | 8/1918 | Hough |
| 1,767,575 | A | 6/1930 | Bujack |
| 2,068,932 | A | 1/1937 | Quarnstrom |
| 2,375,513 | A | 5/1945 | Bach |
| 2,409,342 | A | 10/1946 | Cassidy |
| 2,453,980 | A | 11/1948 | Hartman |
| 2,861,602 | A | 11/1958 | Thomas |
| 3,471,987 | A | 10/1969 | Yelsma |

(Continued)

FOREIGN PATENT DOCUMENTS

| GB | 1010752 A | 11/1965 |
| JP | 1994047434 U | 6/1994 |

(Continued)

*Primary Examiner* — Chi Q Nguyen
(74) *Attorney, Agent, or Firm* — The Webb Law Firm

(57) ABSTRACT

A structural element for constructing an auxiliary means for the manufacture of a reinforcement includes at least one coupling point for coupling the structural element to another structural element. The structural element is formed from a basic element. The structural element may further include a holding means for holding a reinforcement rod. A method for constructing an auxiliary means and a method for manufacturing a reinforcement are also provided.

23 Claims, 4 Drawing Sheets

(56) References Cited

U.S. PATENT DOCUMENTS

| | | |
|---|---|---|
| 3,547,385 A | 12/1970 | Kindorf et al. |
| 3,604,687 A | 9/1971 | Moore |
| 3,721,412 A | 3/1973 | Kindorf |
| 4,044,428 A | 8/1977 | Kowalski |
| 4,483,119 A | 11/1984 | Hernandez |
| 4,617,775 A | 10/1986 | Padrun |
| 4,790,060 A | 12/1988 | Council et al. |
| 4,957,251 A * | 9/1990 | Hubbard ............... 248/68.1 |
| 4,960,253 A | 10/1990 | Perrault et al. |
| 5,639,048 A | 6/1997 | Bartholomew et al. |
| 5,913,341 A | 6/1999 | Jones |
| 6,128,882 A | 10/2000 | Jones |
| 6,508,440 B2 | 1/2003 | Schmidt |
| 6,560,834 B1 | 5/2003 | Wirth |
| 6,622,976 B1 | 9/2003 | Ianello |
| 7,090,174 B2 | 8/2006 | Korczak et al. |
| 7,097,142 B1 | 8/2006 | Schmidt |
| 7,143,563 B1 | 12/2006 | Palmer |
| 7,152,831 B2 | 12/2006 | Riedy et al. |
| 7,293,745 B2 | 11/2007 | Catapano |
| 8,517,186 B1 * | 8/2013 | Mccoy ............... 211/60.1 |
| 8,701,370 B2 * | 4/2014 | Kelly ............... 52/741.1 |
| 2003/0197108 A1 | 10/2003 | Domizio |

FOREIGN PATENT DOCUMENTS

| | | |
|---|---|---|
| JP | 09013399 | 1/1997 |
| WO | 02064906 A1 | 8/2002 |

* cited by examiner

SYSTEM FOR MANUFACTURING A REINFORCEMENT

CROSS REFERENCE TO RELATED APPLICATIONS

This application is a continuation of U.S. patent application Ser. No. 11/597,697, filed Nov. 27, 2006, now U.S. Pat. No. 8,701,370, which is a National Stage Application Under 35 U.S.C. §371 of International Application No. PCT/NL2005/000389, filed May 26, 2005, each of which are incorporated herein by reference in their entirety. International Application No. PCT/NL2005/000389 claims priority to Netherlands Patent No. 1026278, filed May 27, 2004.

FIELD OF THE INVENTION

The invention relates to a structural element for constructing an auxiliary means for manufacturing a reinforcement. The invention also relates to a basic element from which at least one such structural element can be formed. The invention further relates to a holding means for holding a reinforcement rod. The invention also relates to an auxiliary means for manufacturing a reinforcement. The invention further relates to a method for constructing such an auxiliary means. The invention also relates to a method for manufacturing a reinforcement.

BACKGROUND OF THE INVENTION

In the manufacture of a reinforcement for a concrete construction a number of reinforcement rods must usually be connected to each other, using binding wire or by means of welding. This can take place in a concrete formwork, wherein the rods, brought to length and into shape, are arranged in their correct position and then mutually connected with binding wire or welded. Many prefabricated reinforcements or reinforcement parts are also applied which are manufactured elsewhere and then placed in the formwork. In order to manufacture prefabricated reinforcements, particularly reinforcement mesh for floors and walls and reinforcement cages for pillars, beams and so forth, use is made of auxiliary means for placing and holding in the correct position the reinforcement rods for connecting, see for instance U.S. Pat. No. 6,560,834 or WO 02/064906. Such auxiliary means are however expensive because they are made to size for only a single application. When working without such auxiliary means the steel fixer must work with the reinforcement rods by hand, which requires much laborious manipulation and much professional skill, wherein errors are easily made in the dimensioning and a precise positioning and orientation of the rods is difficult.

There therefore exists a need for an affordable and more universal auxiliary means for manufacturing a reinforcement, in particular reinforcement cages, with which the reinforcement rods for connecting can be placed and held in simple and precise manner at their correct position and in the correct orientation. The auxiliary means must preferably be suitable for a plurality of rod diameters, rod lengths and reinforcement geometries, varying from a simple flat reinforcement construction to a more complex, three-dimensional reinforcement construction with for instance curved rods, curved surfaces and corners which are not right angles. It must herein be possible to construct the auxiliary means in simple and easy manner and preferably reuse it for other reinforcements. The object of the present invention is to provide such an auxiliary means.

SUMMARY OF THE INVENTION

The invention provides for this purpose a system comprising a structural element for constructing an auxiliary means for the manufacture of a reinforcement, which auxiliary means comprises a plurality of such structural elements, wherein the structural element is provided with at least one coupling point for coupling the structural element to another structural element. The other structural element can be a similar structural element or a support element, such as a, for instance wooden, board, table or floor. Using a number of such structural elements an auxiliary means can be constructed for the manufacture of a reinforcement, wherein the structural elements are mutually coupled. The construction of the auxiliary means can thus take place simply and easily, and can for instance be compared to the construction of a mechanical structure with the universally known "Meccano" system. After use, the whole can be dismantled again into parts for reuse in the manufacture of another reinforcement.

In addition to at least one first type of coupling point for coupling the structural element to at least one similar structural element, the structural element can be provided with at least one second type of coupling point for coupling the structural element to at least one support element. An auxiliary means can thus be constructed making use of one or more support elements such as a, for instance wooden, board, table or floor. A second type of coupling point can herein coincide with a first type of coupling point. The same coupling point can then be used for mutual coupling of similar structural elements as well as for mutually coupling a structural element and a support element. A structural element can comprise at least one holding means for holding at least one reinforcement rod. A holding means can be integrated with the structural element or mounted separately thereon. A structural element can also be provided with a calibration which can be used in the constructing of the auxiliary means and in placing of holding means.

The structural element is preferably provided with at least one mounting point for mounting at least one holding means for holding at least one reinforcement rod. A plurality of mounting points can herein be arranged at regular mutual distances. Owing to the, preferably standardized, regular mutual distances measuring and precise setting-out of the holding means and the construction of the whole auxiliary means becomes relatively simple and the risk of dimensioning errors is drastically reduced. A great accuracy can thus be achieved in respect of the whole spatial construction of the final reinforcement. A mounting point is preferably embodied here such that a holding means can be mounted releasably. This enables mounting and removal in a single, simple operation. A mounting point can for instance comprise a preferably round recess.

In addition to mounting points at discrete distances, it is also possible for the holding means to be mounted at random positions on the structural elements, for instance by simply clamping them in the manner of clothes-pegs on a washing line. A structural element can herein be provided with a calibration.

A mounting point can herein be embodied such that a holding means can be mounted in multiple orientations relative to a structural element. The orientation of the holding means relative to the relevant constructing means can thus be freely chosen, and thereby also the angle between a reinforcement rod held fast by the holding means and the relevant constructing means. Reinforcements with rods which do not cross each other at right angles can thus also be manufactured. At least one coupling point can herein coincide with at least one mounting point. A mounting point can thus also be used for mutual coupling of structural elements.

The system can also comprise a basic element, from which basic element can be formed at least one structural element according to the invention, for instance by cutting, severing and/or bending. Multiple types of structural element can thus be manufactured from a single type of basic element. This will be elucidated further in the following detailed description of the invention.

A holding means according to the invention is preferably suitable for holding a plurality of dimensions of reinforcement rod and/or a plurality of reinforcement rods. The holding means hereby become more universally employable and reinforcements with a number of diameters of reinforcement rod, which is the rule rather than the exception, can be manufactured. The required number of types of holding means can thus also be limited to a minimum. A holding means according to the invention preferably takes a resilient form, and can be clamped on a structural element, engaging for instance in a recess or in other manner on the structural element. A V-shape is found to be well suitable for this purpose. A number of exemplary embodiments with provisions for holding reinforcement rods and for mounting a holding means on a structural element are further described and shown in the following detailed description of the invention.

For the manufacture of a reinforcement using an auxiliary means according to the invention, a number of reinforcement rods can according to the invention now be placed and held in desired mutual positions and orientations by means of holding means according to the invention, whereafter the reinforcement rods are mutually connected, for instance by means of binding wire or by means of welding, to form for instance a reinforcement cage, for instance for a pillar or a beam. A reinforcement can thus be manufactured quickly, relatively simply and precisely.

SHORT DESCRIPTION OF THE DRAWINGS

The invention is elucidated hereinbelow on the basis of a number of non-limitative exemplary embodiments of a structural element, a holding means and an auxiliary means according to the invention. Herein:

DETAILED DESCRIPTION OF THE INVENTION

Figure 1:
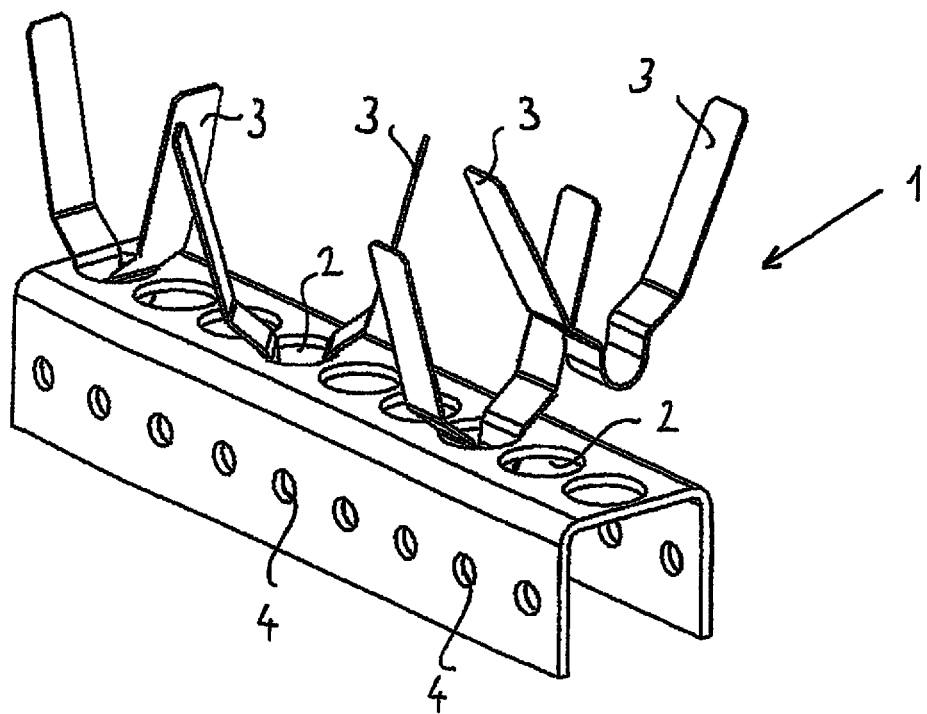
FIG. 1 shows a first exemplary embodiment of a structural element according to a first embodiment of the present invention.

FIG. 1 shows a first exemplary embodiment of a structural element generally denoted as reference numeral 1.

Structural element 1 is provided with recesses 2, in this embodiment round holes at regular mutual distances, which form mounting points for arranging holding means 3 for positioning and holding reinforcement rods. The distance between the mounting points is for instance 2.5 cm, which distance can be standardized. Measuring and precise setting-out of holding means 3 hereby becomes relatively simple and the chance of errors is drastically reduced. Structural element 1 is also provided with coupling points, in this embodiment round holes 4 for mutually coupling a plurality of such structural elements 1 to form an auxiliary means according to the invention. The holes for mutual coupling 4 and recesses 2 can also have the same diameter, and even fully coincide. This will of course result in advantages in the production and use of structural element 1.

Figure 2:
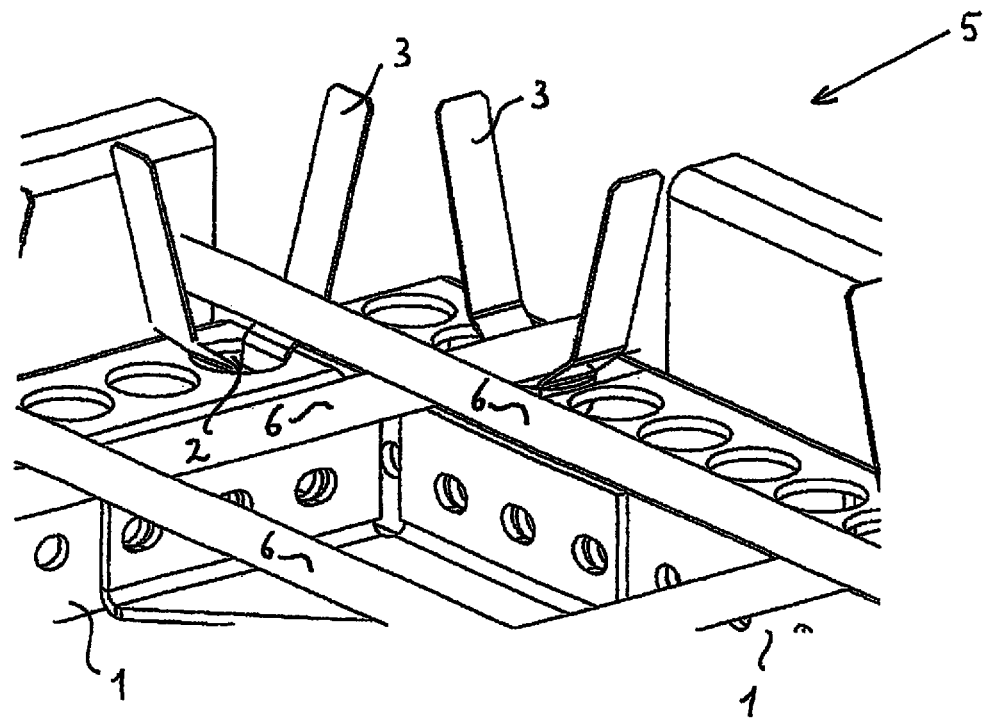
FIG. 2 shows a part of an exemplary embodiment of an auxiliary means according to the invention.

FIG. 2 shows a part of an auxiliary means, generally denoted as reference numeral 5, built up of a number of structural elements 1 and holding means 3 according to the invention. Structural elements 1 are coupled releasably to each other and holding means 3 are mounted releasably at the appropriate locations. A number of reinforcement rods 6 is held in place by means of holding means 3.

Figure 3:
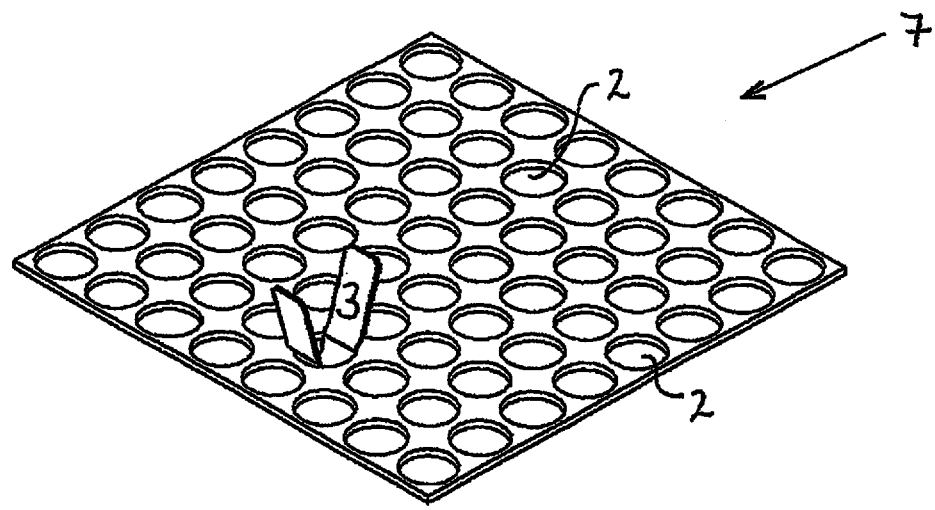
FIG. 3 shows a second exemplary embodiment of a structural element according to the invention with a holding means according to the invention.

FIG. 3 shows a second exemplary embodiment of a structural element generally denoted as reference numeral 7. Structural element 7 is again provided with recesses 2, in this embodiment round holes at regular mutual distances in a two-dimensional placing, which once again form mounting points for the arrangement of holding means 3 for positioning and holding reinforcement rods. The distance between recesses 2 is again for instance 2.5 cm. Recesses 2 can for instance again also be used to couple the structural element 7 to other structural elements according to the invention or to a support element such as a board, table or floor.

Figure 4:
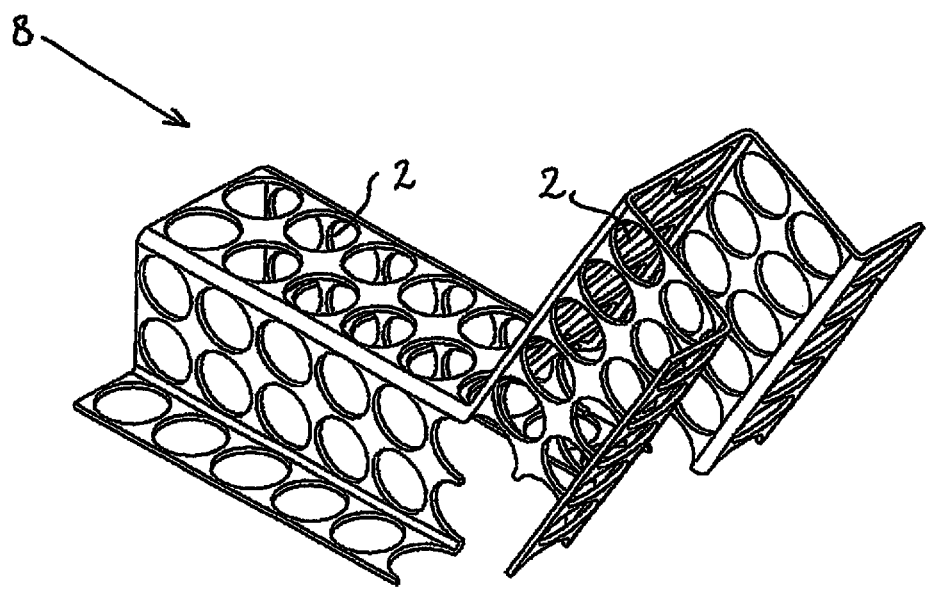
FIG. 4 shows a third exemplary embodiment of a structural element according to the invention.

FIG. 4 shows a third exemplary embodiment of a structural element generally denoted as reference numeral 8. Structural element 8 is again provided with recesses 2, in this embodiment round holes at regular mutual distances in a three-dimensional placing, which once again form mounting points for the arrangement of holding means for positioning and holding reinforcement rods. The distance between recesses 2 is again for instance 2.5 cm. Recesses 2 can for instance again also be used to couple the structural element 8 to other structural elements according to the invention or to a support element such as a board, table or floor. Such a structural element can be formed, for instance by cutting, severing and/or bending, from a basic element according to the invention. Use is for instance made here of a single type of strip provided with holes. In this embodiment the structural element 8 is formed from such a strip by severing and bending.

Figure 5:
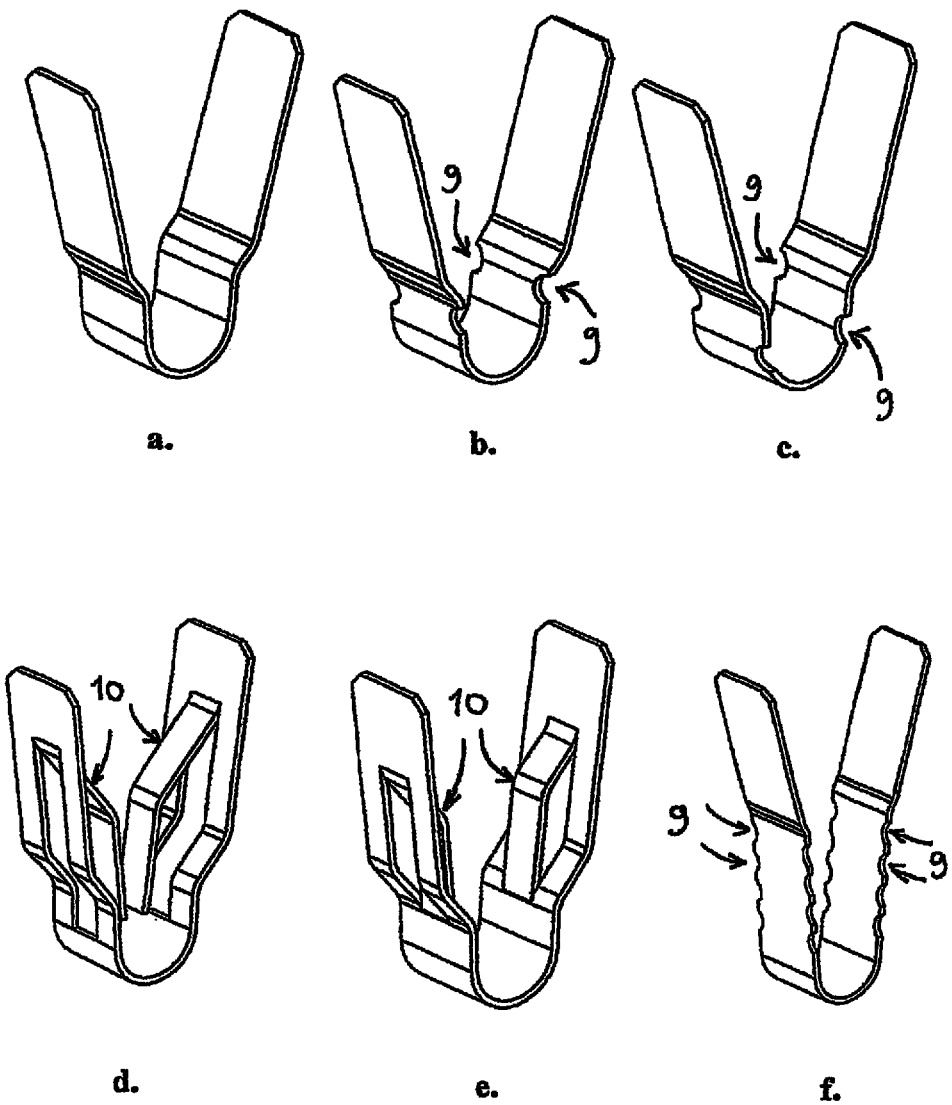
FIG. 5 shows six exemplary embodiments of a holding means according to the invention.

FIG. 5 shows six exemplary embodiments (a-f) of a holding means according to the invention. The shown holding means a-f take a resilient form whereby in simple manner they can be clamped into, and also removed from, a recess 2 provided for this purpose in a structural element 1, 7, or 8. As shown in FIG. 1, the orientation of the holding means relative to the associated structural element can herein be freely chosen, and thereby also the angle between a reinforcement rod held fast by the holding means and the relevant constructing means. Reinforcements with rods which do not cross each other at right angles can thus also be manufactured. Multiple diameters of reinforcement rod can be held releasably due to the V-shape and the elastic deformability. The holding means hereby becomes more universally employable and reinforcements with a number of diameters of reinforcement rod, which is the rule rather than the exception, can be manufactured, wherein only a single or a very limited number of types of holding means is used.

Recesses 9 can also be arranged in the holding means to enable more precise and simple mounting thereof on a structural element. Additional provisions 10 can also be arranged for clamping (multiple diameters of) reinforcement rods.

In one embodiment of a holding means according to the invention (not shown), the holding means can for instance also be suitable for holding a plurality of reinforcement rods.

Figure 6:
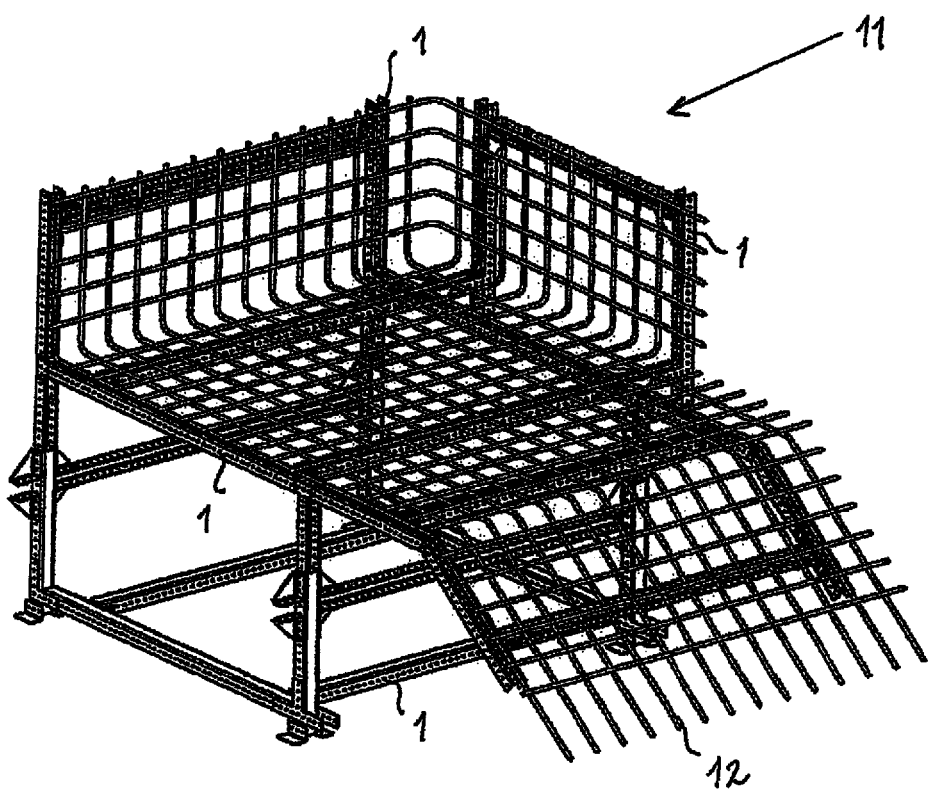
FIG. 6 shows an exemplary embodiment of an auxiliary means according to the invention.

FIG. 6 finally shows an exemplary embodiment of an auxiliary means 11 according to the invention constructed from a number of structural elements 1 and holding means according to the invention. Structural elements 1 are coupled releasably to each other. The construction of such an auxiliary means 11 can take place quickly and easily and is comparable to the construction of a mechanical structure with the universally known "Meccano" system. After use, auxiliary means 11 can once again be wholly or partially dismantled into parts for reuse in the manufacture of another reinforcement. A reinforcement 12 for a concrete construction can be manufactured by means of such an auxiliary means 11. A more complex three-dimensional reinforcement with non-right angles can be manufactured relatively simply, quickly and precisely in accordance with a method according to the invention.

The whole spatial geometry of a reinforcement and the separate positioning of each individual rod can be realized better and more accurately according to the invention than with known methods, tools and devices. Smaller and larger series which cannot be produced by means of a partly or fully automated machine can thus be realized quickly and precisely.

Although elucidated on the basis of a limited number of exemplary embodiments, the invention comprises any system wherein an auxiliary means for manufacturing a reinforcement is built up of a number of structural elements according to the invention; thus, in addition to the described and shown "meccano"-like system and the system making use of a number of basic elements according to the invention, for instance also a "lego"-like system with block-shaped structural elements.

The invention claimed is:

1. A system for manufacturing a reinforcement, the system comprising:
   an auxiliary means comprising a plurality of structural elements releasably coupled together, each structural element comprising:
      a body member comprising an upper surface having a plurality of first mounting points formed therein, a first side surface extending from a first edge of the upper surface, and a second side surface extending from a second edge of the upper surface; and
      at least one of a plurality of second mounting points and a plurality of coupling points formed in at least one of the first side surface and the second side surface; and
   at least one holding means mounted to at least one of the first or second mounting points, the at least one holding means comprising at least one first member and one second member defining a gap therebetween for receiving at least one reinforcement rod therein.

2. The system as claimed in claim 1, wherein the plurality of coupling points allow the plurality of structural elements to be coupled together.

3. The system as claimed in claim 1, wherein the coupling points allow the plurality of structural elements to be coupled to at least one support element.

4. The system as claimed in claim 1, wherein the plurality of coupling points and the plurality of first and second mounting points are arranged at regular mutual distances.

5. The system as claimed in claim 1, wherein the plurality of structural elements are provided with a calibration.

6. The system as claimed in claim 1, wherein the at least one holding means is mounted in a desired orientation relative to the structural element.

7. The system as claimed in claim 1, wherein each of the plurality of structural elements is formed from a basic element by cutting, severing, bending, or any combination thereof.

8. The system as claimed in claim 1, wherein the first member and the second member of the at least one holding means extend from the upper surface of the body member at an angle.

9. The system as claimed in claim 1, wherein the at least one first member and one second member of the at least one holding means form a substantially V-shape defining the gap.

10. A structural element for constructing an auxiliary means for the manufacture of a reinforcement, the structural element comprising:
    a body member comprising an upper surface having a plurality of first mounting points formed therein, a first side surface extending from a first edge of the upper surface, and a second side surface extending from a second edge of the upper surface; and
    at least one of a plurality of second mounting points and a plurality of coupling points formed in at least one of the first side surface and the second side surface,
    wherein at least one holding means is mounted to at least one of the first or second mounting points and the at least one holding means comprises at least one first member and one second member defining a gap therebetween for receiving at least one reinforcement rod therein.

11. The structural element as claimed in claim 10, wherein the plurality of mounting points allow the structural element to be coupled to a similar structural element.

12. The structural element as claimed in claim 10, wherein the plurality of mounting points allow the structural element to be coupled to at least one support element.

13. The structural element as claimed in claim 10, wherein the plurality of coupling points and the plurality of first and second mounting points are arranged at regular mutual distances.

14. The structural element as claimed in claim 10, wherein the structural element is provided with a calibration.

15. The structural element as claimed in claim 10, wherein the at least one holding means is mounted in a desired orientation relative to the structural element.

16. The structural element as claimed in claim 10, wherein the structural element is formed from a basic element by cutting, severing, bending, or any combination thereof.

17. The system as claimed in claim 10, wherein the first member and the second member of the at least one holding means extend from the upper surface of the body member at an angle.

18. The structural element as claimed in claim 10, wherein the at least one first member and one second member of the at least one holding means form a substantially V-shape defining the gap.

19. A holding means for holding a reinforcement rod, the holding means configured to be releasably mounted on a structural element comprising a body member comprising an upper surface having a plurality of first mounting points formed therein, a first side surface extending from a first edge of the upper surface, and a second side surface extending from a second edge of the upper surface; and at least one of a plurality of second mounting points and a plurality of coupling points formed in at least one of the first side surface and the second side surface, the holding means comprising:
    at least one first member and one second member defining a gap therebetween for receiving at least one reinforcement rod therein, wherein the holding means is mounted to at least one of the first or second mounting points of the structural element for releasably mounting the holding means to the structural element.

20. The holding means as claimed in claim 19, wherein the holding means is adapted to hold a plurality of dimensions of reinforcement rods.

21. The holding means as claimed in claim 19, wherein the holding means is adapted to hold a plurality of reinforcement rods.

22. The holding means as claimed in claim 19, wherein the holding means is mountable in multiple orientations relative to the structural element.

23. The holding means as claimed in claim 19, wherein the at least one first member and one second member form a substantially V-shape defining the gap.

* * * * *

UNITED STATES PATENT AND TRADEMARK OFFICE
CERTIFICATE OF CORRECTION

| | |
|---|---|
| PATENT NO. | : 9,032,687 B2 |
| APPLICATION NO. | : 14/197740 |
| DATED | : May 19, 2015 |
| INVENTOR(S) | : Steven Edward Kelly |

It is certified that error appears in the above-identified patent and that said Letters Patent is hereby corrected as shown below:

In The Specification

Column 1, Line 8, delete "Nov. 27, 2006," and insert -- Mar. 5, 2008 --

In The Claims

Column 6, Line 47, Claim 17, delete "The system as claimed in claim 10," and insert -- The structural element as claimed in claim 10, --

Signed and Sealed this
Twenty-ninth Day of December, 2015

Michelle K. Lee
*Director of the United States Patent and Trademark Office*